(12) United States Patent
Wang et al.

(10) Patent No.: US 10,251,192 B2
(45) Date of Patent: Apr. 2, 2019

(54) METHOD OF INDICATING SCHEDULING ASSIGNMENT IN DEVICE TO DEVICE WIRELESS COMMUNICATION, AND D2D-ENABLED WIRELESS DEVICE USING THE METHOD

(71) Applicant: Panasonic Intellectual Property Corporation of America, Torrance, CA (US)

(72) Inventors: Lilei Wang, Beijing (CN); Hidetoshi Suzuki, Kanagawa (JP); Masayuki Hoshino, Kanagawa (JP); Alexander Golitschek Edler Von Elbwart, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 172 days.

(21) Appl. No.: 15/232,568

(22) Filed: Aug. 9, 2016

(65) Prior Publication Data
US 2016/0353477 A1     Dec. 1, 2016

Related U.S. Application Data

(63) Continuation of application No. PCT/CN2014/077710, filed on May 16, 2014.

(51) Int. Cl.
*H04W 72/12*     (2009.01)
*H04W 74/08*     (2009.01)

(52) U.S. Cl.
CPC ... *H04W 72/1278* (2013.01); *H04W 72/1215* (2013.01); *H04W 74/085* (2013.01)

(58) Field of Classification Search
None
See application file for complete search history.

(56) References Cited

U.S. PATENT DOCUMENTS

| | | | |
|---|---|---|---|
| 8,320,319 B2 * | 11/2012 | Lohr | H04W 72/042 370/329 |
| 2010/0070815 A1 * | 3/2010 | Papasakellariou | H04L 1/0061 714/748 |

(Continued)

FOREIGN PATENT DOCUMENTS

WO     2009/045047     4/2009

OTHER PUBLICATIONS

Kyocera, "Design details of scheduling assignments," R1-142480, 3GPP TSG-RAN WG1 Meeting #77, Agenda Item: 6.2.5.1.2, May 19-23, 2014, 7 pages.

(Continued)

*Primary Examiner* — James P Duffy
(74) *Attorney, Agent, or Firm* — Seed IP Law Group LLP

(57) ABSTRACT

The present disclosure provides a scheduling assignment indicating method and device-to-device (D2D)-enabled wireless device. The method is used by D2D-enabled wireless devices communicating with each other via multiple SA periods, each of which including a SA pool and a data pool, wherein the SA pool is used for transmitting SA for assigning data resource of the data pools, the method comprising: selecting SA resources in SA pools of more SA periods to transmit SA to assign the same data resource for the D2D-enabled wireless device. The SA indicating method and D2D-enabled wireless device according to the present disclosure can increase the capacity of the SA pools, avoid SA and/or data transmission collisions, and increase the robustness of the SA transmission.

12 Claims, 8 Drawing Sheets

(56) References Cited

U.S. PATENT DOCUMENTS

2012/0034927 A1* 2/2012 Papasakellariou .... H04L 1/1861
        455/450
2016/0057718 A1* 2/2016 Sorrentino ............ H04W 8/005
        370/350
2016/0278009 A1* 9/2016 Sorrentino ............ H04W 72/02

OTHER PUBLICATIONS

Cewit, "On Scheduling Assignment Message Design," R1-141685, 3GPP TSG-RAN WG1 Meeting #76bis, Agenda Item: 7.2.7.1.2, Mar. 31-Apr. 4, 2014, 2014, 4 pages.
International Search Report of PCT application No. PCT/CN2014/077710 dated Feb. 17, 2015.
English Translation of Chinese Search Report dated Oct. 19, 2018 for the related Chinese Patent Application No. 201480065925.2.

* cited by examiner

SA pools of more SA periods are selected to transmit SA to assign the same data resources for a D2D-enabled wireless device ~S1401

METHOD OF INDICATING SCHEDULING ASSIGNMENT IN DEVICE TO DEVICE WIRELESS COMMUNICATION, AND D2D-ENABLED WIRELESS DEVICE USING THE METHOD

BACKGROUND

1. Technical Field

The present disclosure relates to a method of indicating scheduling assignment in device to device wireless communication, and D2D-enabled wireless device using the method.

2. Description of the Related Art

Device to device communication (D2D) is direct communication between devices and such kind of communication could happen within network coverage (for commercial case) and without network coverage (public safety).

In the device to device communication, the communication system comprises multiple D2D-enabled wireless devices communicating via successive scheduling assignment (SA) periods, and each of SA periods includes a SA pool and a data pool. The SA pool of the SA period is used for transmitting SAs for assigning data resources of the data pool of the SA periods for the same or different D2D-enabled wireless devices.

FIG. 1 shows a diagram that a SA pool of a SA period is used for transmitting SA for assigning data resource of the data pools of multiple successive SA periods for the same D2D-enabled wireless device. In FIG. 1, for example five SA periods including SA period #1, SA period #2, SA period #3, SA period #4, and SA period #5 are shown, each of the SA periods includes a SA pool as indicated by reference numerals 101, 102, 103, 104, 105, a data pool as indicated by reference numerals 111, 112, 113, 114, 115.

As shown in FIG. 1, the SA pool 101 of the SA period #1 is used for transmitting SA for assigning the data resource of the data pools 111, 112, 113, 114, 115 of the SA period #1, SA period #2, SA period #3, SA period #4, and SA period #5, and the SA pools of the SA period #2, SA period #3, SA period #4, and SA period #5 are not used for transmitting SAs any more. In the SA pools which do not transmit SA, the UE can receive SAs transmitted by other UEs. In this situation, the D2D-enabled wireless device does not need to transmit SAs in each SA period, and it can improve the ratio of receiving SAs, and save the transmission power of the D2D-enabled wireless device.

However, since the source allocation is based on D2D-enabled wireless device's own selection, the SA and/or data transmissions may collide if the D2D-enabled wireless device misses assignment signaling, which is for example transmitted in SA period #1 to indicate data resources in all five SA periods in FIG. 1.

SUMMARY

The present disclosure is made in consideration of the above aspects.

In an embodiment of the present disclosure, a scheduling assignment (SA) indicating method is provided, the method is used by device-to-device (D2D)-enabled wireless devices communicating with each other via multiple SA periods, each of which including a SA pool and a data pool, wherein the SA pool is used for transmitting SAs for assigning data resource of the data pools, the method comprising: selecting SA resources in SA pools of more SA periods to transmit SAs for assigning the same data resources for a D2D-enabled wireless device.

In an example of the embodiment, the method further comprising: using reserved SA resources to repetitively transmit the SAs of other D2D-enabled wireless devices, wherein the reserved SA resources are the SA resources linked to the same data resource pattern of the unselected SA periods as the data resource pattern of the selected SA periods.

In an example of the embodiment, the method further comprising: using device ID indicated in SA or linkage between repeated SA index or index of SA resource to be transmitted to determine whether two SAs are repeated.

In an example of the embodiment, the data resource pattern of other D2D-enabled wireless devices is still determined by original SA index of other D2D-enabled wireless devices.

In an example of the embodiment, the method further comprising: using reserved SA resources to transmit SAs of other D2D-enabled wireless devices to assign new data resources, wherein the reserved SA resources are the SA resources linked to the same data resource pattern of the unselected SA periods as the data resource pattern of the selected SA periods.

In an example of the embodiment, data resource pattern of other D2D-enabled wireless devices is determined by SA index of the D2D-enabled wireless device and one offset, which is indicated in the SA or specified or pre-defined.

In an example of the embodiment, the method further comprising: transmitting SAs of different D2D-enabled wireless devices in the same or different SA periods in an interleaving way based on the device ID or configuration by eNB or in-coverage UE.

In an example of the embodiment, in time domain, the SA pool of one SA period includes multiple SA candidates, the SA candidates to transmit the SA of the D2D-enabled wireless device in one SA period are shifted to other positions in the next SA period but the relative candidate index to transmit such SA is unchanged.

In an example of the embodiment, in time domain, the SA pool of one SA period includes multiple SA candidates, the SA candidates to transmit the SA of the D2D-enabled wireless device in one SA period are unchanged in the position of the next SA period but the relative candidate index to transmit the SA is shifted.

In an example of the embodiment, data length indicator in the SA of first SA period indicates the whole data length, and the data length indicator in the SA of middle SA period indicates a reduced data length which reflects remained SA periods for data resource allocation.

In an example of the embodiment, data length indicator in the SA of first SA period indicates the whole data length, and the data length indicator in the SA of middle SA period indicates "continue" or "stop" using 1 bit for next SA periods.

In an example of the embodiment, other bits of data length field of the SA except for the 1 bit indicating "continue" or "stop" are used for virtual CRC.

In an example of the embodiment, when the SA resource of a SA period for assigning the data resource is detected by a D2D-enabled wireless device, the SA resource indicating the same data resource in next SA period is not detected by such a D2D-enabled wireless device.

In another embodiment of the present disclosure, a device-to-device (D2D)-enabled wireless device is provided, the device communicates with other D2D-enabled wireless devices via multiple SA periods, each of the multiple SA periods including a SA pool and a data pool, wherein the SA pool is used to transmit SAs for assigning data resource of the data pools, the D2D-enabled wireless device comprising: a selection unit configured to select SA resources in SA pools of more SA periods to transmit the SAs for assigning the same data resources for a D2D-enabled wireless device.

In an example of the embodiment, the selection unit is further configured to use reserved SA resources to repetitively transmit the SAs of other D2D-enabled wireless devices or to transmit SAs of other D2D-enabled wireless devices to assign new data resources, wherein the reserved SA resources are the SA resources linked to the same data resource pattern of the unselected SA periods as the data resource pattern of the selected SA periods.

The SA indicating method and D2D-enabled wireless device according to the present disclosure can increase the capacity of the SA pools, avoid SA and/or data transmission collisions, and increase the robustness of the SA transmission.

In the meantime, the error detection performance could be improved due to the virtual CRC usage.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

These and/or other aspects and advantages of the present disclosure will become clearer and easier to be understood in detailed description of embodiments of the present disclosure below in conjunction with attached drawings, in which.

DETAILED DESCRIPTION

Figure 1:
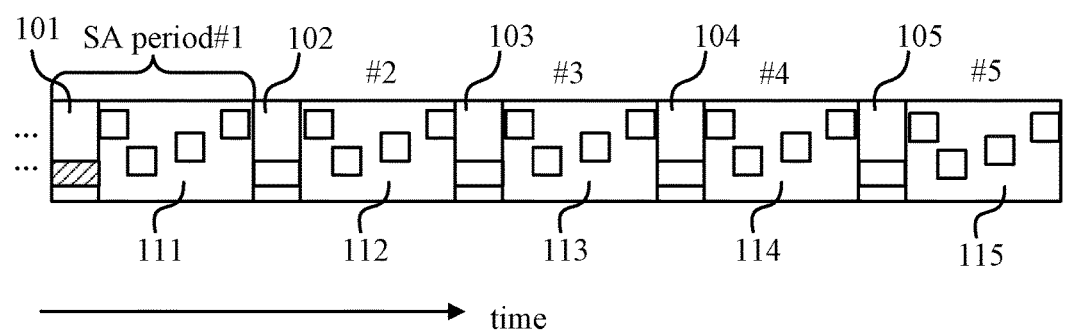
FIG. 1 is a diagram that a SA pool of a SA period is used for transmitting SA for assigning data resource of the data pools for the same D2D-enabled wireless device.

In the following detailed description, reference is made to the accompanying drawings, which form a part of the present disclosure. In the drawings, similar symbols typically indicate similar components, unless the context dictates otherwise. It will be readily understood that aspects of the present disclosure can be arranged, substituted, combined, and designed in a wide variety of different configurations, all of which are explicitly contemplated and make a part of the present disclosure.

The present disclosure will be described below in conjunction with the drawings.

Figure 2:
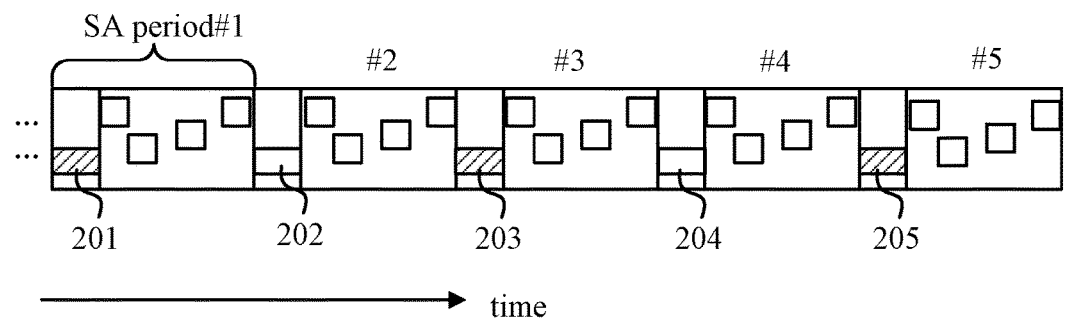
FIG. 2 is a diagram that SA pools of more SA periods are used for transmitting SA to indicate the same data resources indicated by SA in SA period #1 according to an embodiment of the present disclosure.

FIG. 2 is a diagram that SA pools of more SA periods are used for transmitting SA to indicate the same data resources indicated by SA in SA period #1 according to an embodiment of the present disclosure.

In the present embodiment, a scheduling assignment (SA) indicating method is provided, which is used by device-to-device (D2D)-enabled wireless devices communicating with each other via multiple SA periods, each of multiple SA periods includes a SA pool and a data pool, wherein the SA pool is used to transmit SA for assigning data resource of the data pools.

In one example, the SA includes information indicating a data resource pattern in the data pools of SA periods for the D2D-enabled wireless devices (referred to as UEs hereinafter) implicitly, and SA also indicates the IDs of a receiving UE (target device) or a transmitting UE (source device). SA resources for transmitting SA may be identified by such as a SA index or SA resource index.

According to the present embodiment, SA pools of more SA periods are selected to transmit SAs for assigning the same data resources for a D2D-enabled wireless device. According to the present embodiment, SA transmission opportunities are increased, as shown in FIG. 2, besides the SA pool 201, the UE also uses the SA pools 203 and 205 in the SA period #3 and #5 to transmit the SA to indicate remained data resource. In the SA pools which do not transmit SA, such as the SA pools 202 and 204, the SAs transmitted by other UEs can be detected and received.

In the present disclosure, the SA transmitted in the SA pool indicates that particular data resource pattern corresponds to mapping of data resource in the data pool, and at least two of those patterns have no overlap in time domain within the data pool.

According to the present embodiment, more SA transmissions could help UEs avoid collisions with each other.

According to another embodiment of the present application, when a UE detects a SA resource at any one of the SA pools 201, 203, 205, the UE knows that the next SA period such as SA pools 202 and 204 will not transmit the SA, so the UE will not perform detection on the next SA period. That is, when the SA resource of a SA period for assigning the data resource is detected by a D2D-enabled wireless device (UE), the SA resource indicating the same data resource in next SA period is not detected by such a D2D-enabled wireless device. In such a way, the power of the D2D-enabled wireless devices is saved.

Figure 3:
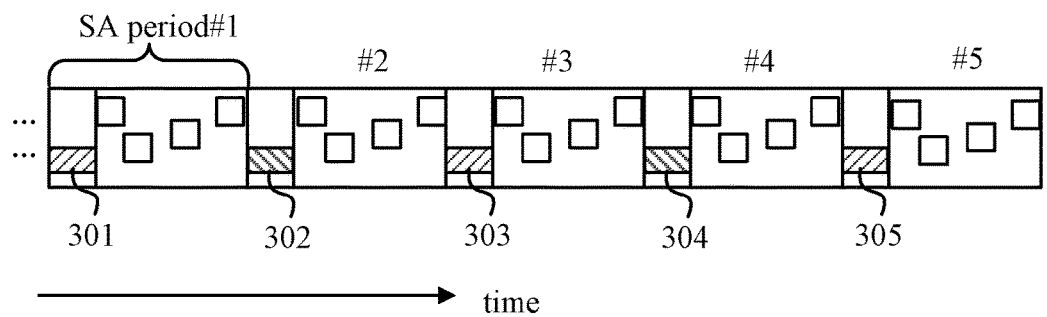
FIG. 3 is a diagram showing that reserved SA resources of unselected SA pools linked to the data resources are used for transmitting SA of other D2D-enabled wireless devices according to an embodiment of the present disclosure.

FIG. 3 is a diagram showing that reserved SA resources of unselected SA pools linked to the data resources are used for transmitting SA of other D2D-enabled wireless devices according to an embodiment of the present disclosure.

In the present embodiment, SA resources linked to the same data resource pattern of unselected SA periods of a D2D-enabled wireless device (called as reserved SA resources) as the data resource pattern of the selected SA periods are used to repetitively transmit the SAs of other D2D-enabled wireless devices.

As shown in FIG. 3, the reserved SA resources 302 and 304 which are represented by reverse diagonal-line of the unselected SA periods are used to repetitively transmit the SAs of other D2D-enabled wireless devices, in which the reserved SA resources 302 and 304 are linked to the same data resources as the SA resources 301, 303 and 305.

Figure 4:
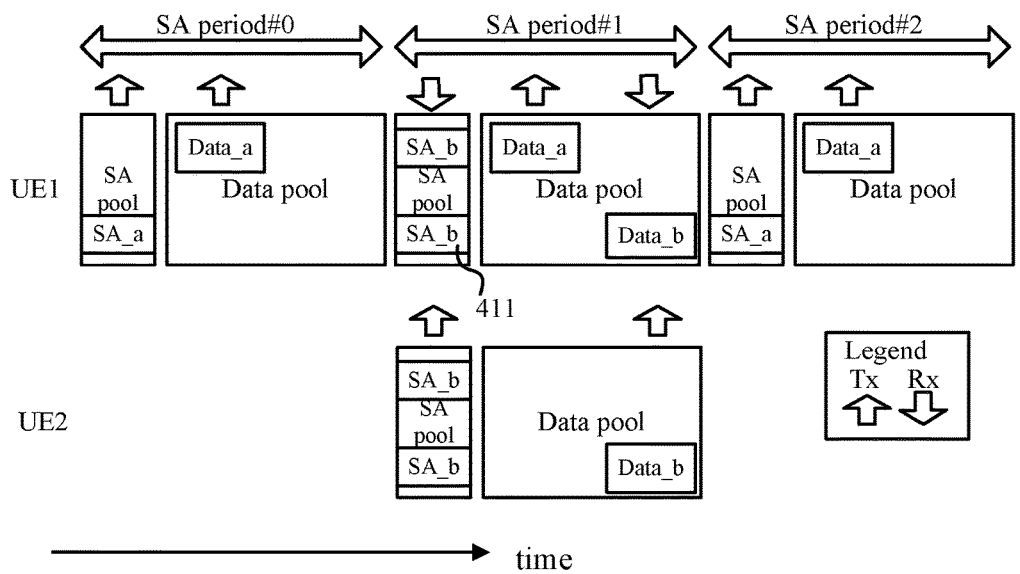
FIG. 4 is a further diagram showing that reserved SA resources of unselected SA periods are used for transmitting SA of other D2D-enabled wireless devices according to an embodiment of the present disclosure.

FIG. 4 is a further diagram showing that reserved SA resources of unselected SA periods are used for transmitting SA of other D2D-enabled wireless devices according to an embodiment of the present disclosure.

As shown in FIG. 4, the SA pools of the SA periods #0 and #2 are used for UE1 to transmit "SA_a" to assign data resource of "Data_a", and the SA pool 411 of the SA period #1 which is not selected by UE1 for transmitting SA_a is used for UE2 to transmit SA_b to assign data resource of "Data_b". According to the embodiment of the present disclosure, UE2 knows from previous SA periods that UE1 has a reserved SA resource in SA pool 411 in the SA period #1, so UE2 transmits the same "SA_b" in the reserved SA in SA pool 411 by UE1.

In one example, UE1 will also monitor its own reserved SA resource for potential soft combining of the SA_b, for example by a source device ID or a target device ID indicated in the SA, or by certain linked relationship between the SA_b and the reserved SA_a. Similarly, according to another embodiment, in a target device, a device ID indicated in SA or linkage between the repeated SA index or index of SA resource to be transmitted may be used to determine whether two SAs are repeated.

In the example, the new SA_b in the reserved SA in SA pool 411 does not assign new data resource to "data_b" but only indicate the data resource originally assigned by the original "SA_b", so the data resource "data_b" is decided by the original SA_b but not the new SA_b. That is, the data resource pattern indicated by the new SA of other D2D-enabled wireless devices is still determined by original SA index of other D2D-enabled wireless devices.

The above embodiment will increase the robustness of the "SA_b".

Figure 5:
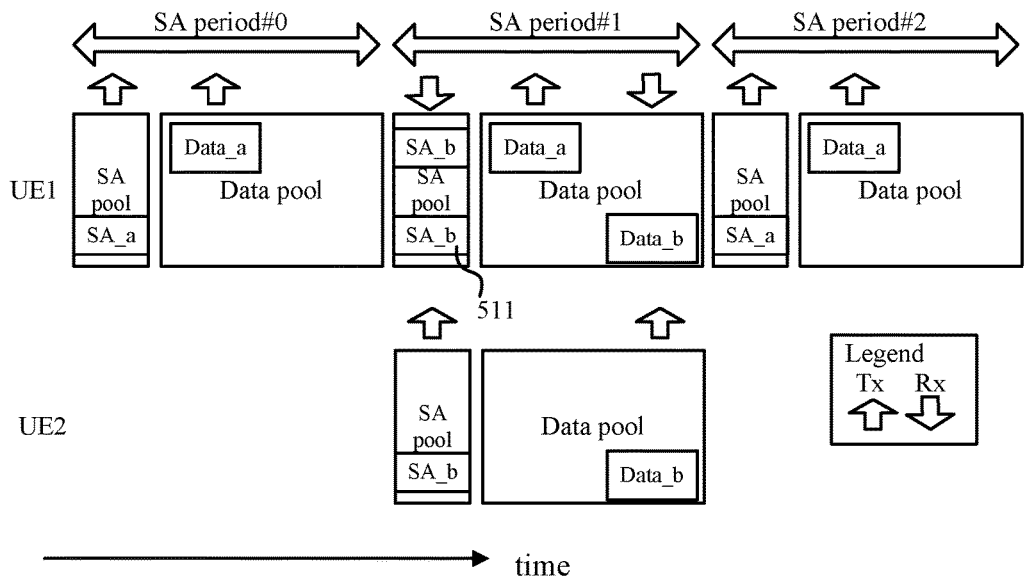
FIG. 5 is a further diagram showing that reserved SA resources in unselected SA pools are used for transmitting SA of other D2D-enabled wireless devices according to an embodiment of the present disclosure.

FIG. 5 is a further diagram showing that reserved SA resources in unselected SA pools are used for transmitting SA of other D2D-enabled wireless devices according to an embodiment of the present disclosure.

According to the present embodiment, reserved SA resources in unselected SA pools of the D2D-enabled wireless device are used to transmit SAs of other D2D-enabled wireless devices to assign new data resources.

As shown in FIG. 5, the SA pools of the SA periods #0 and #2 are used for UE1 to transmit "SA_a" to assign data resource of "Data_a", and the reserved SA resource 511 of the SA period #1 which is not selected by UE1 for transmitting SA_a is used for UE2 to transmit SA_b to assign data resource of "Data_b".

According to the embodiment of the present disclosure, UE2 knows from previous SA periods that UE1 has a reserved SA resource 511 in the SA period #1, so UE2 transmits a new "SA_b" in the SA resource 511 reserved by UE1. In one example, UE1 will also monitor its own reserved SA resource for decoding the new SA_b. In this example, the data resource of "data_b" is decided by index of new SA_b+offset, in which the offset could be indicated in the SA_b, or the offset could be specified or pre-defined in some ways known by those skilled in the art.

That is, the data resource pattern of other D2D-enabled wireless devices is determined by SA index of the D2D-enabled wireless device and one offset, which is indicated in the SA or specified or pre-defined.

The above embodiment will increase the capacity of the SA pools.

Figure 6:
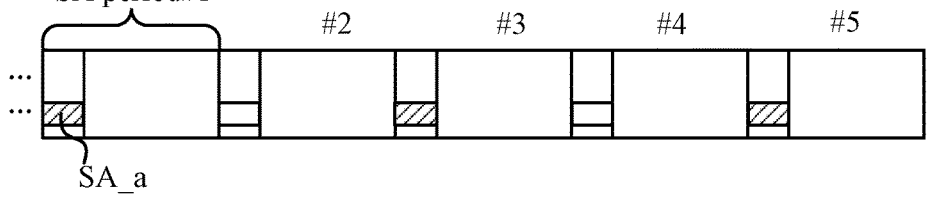
FIG. 6 is a diagram that SA periods to transmit SA are UE specific and interleaved to each other according to an embodiment of the present disclosure.
Figure 6:
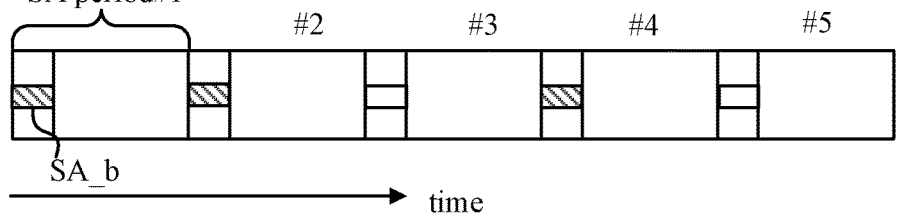

FIG. 6 is a diagram showing that SA periods to transmit SA are UE specific and interleaved to each other.

As shown in FIG. 6, UE1 transmits SA_a in SA period #1, #3 and #5, and UE2 transmits SA_b in SA period #1, #2 and #4. There is no SA and/or data collision among SA periods #2-#5. That is, in the present embodiment, SAs of different D2D-enabled wireless devices are transmitted in the same or different SA periods in an interleaving way based on device IDs or configuration by eNB or in-coverage UE. That is, when the D2D-enabled wireless devices are within the coverage of the eNB, the transmission of the SAs can be configured by the eNB. When the D2D-enabled wireless devices are out of the coverage of the eNB, the transmission of the SAs can be configured by other in-coverage devices, or based on the identified device IDs.

As shown in FIG. 6, UE1 will transmit its SA_a in SA periods #1, #3, #5, and receive SA_b in periods #2 and #4. UE2 will transmit SA_b in SA periods #1, #2, #4, and receive SA_a in periods #3 and #5. Each of UE1 and UE2 has opportunities to receive another UE's SA so that additional SA and/or data transmission collisions can be avoided.

Figure 7:
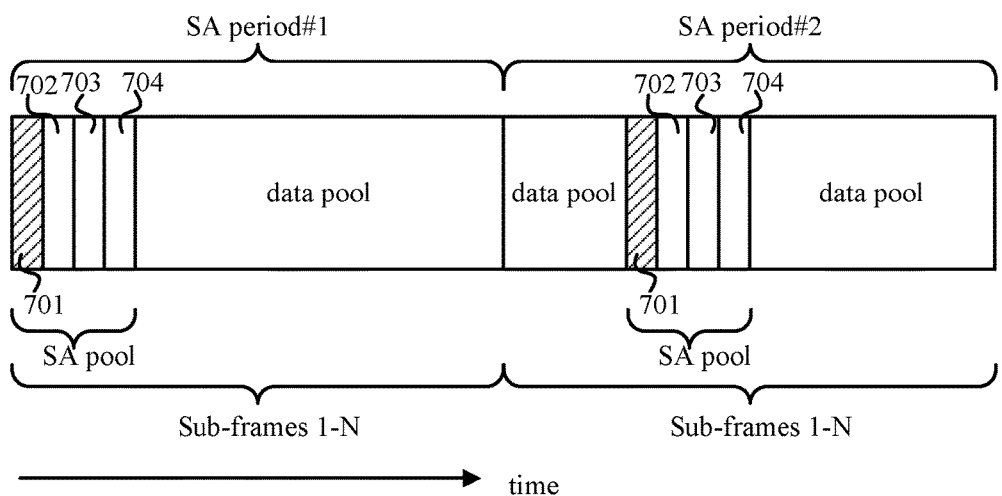
FIG. 7 is a diagram that SA transmission varies in time domain according to an embodiment of the present disclosure.

FIG. 7 is a diagram showing that SA transmission varies in time domain according to an embodiment of the present disclosure.

As shown in FIG. 7, each SA period spans multiple sub-frames such as sub-frames 1-N in time domain, and the SA pool includes multiple SA candidates (four candidates are shown as an example) in time domain, such as SA candidates 701, 702, 703, 704. The SA candidates are used to transmit SA for assigning data resource of the data pools for multiple D2D-enabled wireless devices.

In the present embodiment, in time domain, the SA pool of one SA period includes multiple SA candidates, the SA candidates to transmit the SA of the D2D-enabled wireless device in one SA period are shifted to other positions in the next SA period but the relative candidate index to transmit such SA is unchanged.

Specifically, in the SA period #1, the SA pool including four SA candidates is located at the beginning position of the SA period, but in the SA period #2, the SA pool including four SA candidates is located at another position which is different from the beginning position of the SA period. In both the SA periods #1 and #2, the SA candidate 701 is used to transmit the SA, that is, the relative candidate index (shown as "701") to transmit such SA is not changed, but the whole SA pool or SA candidates for such D2D UE is shifted to a second position which is not the same as the original position.

Figure 8:
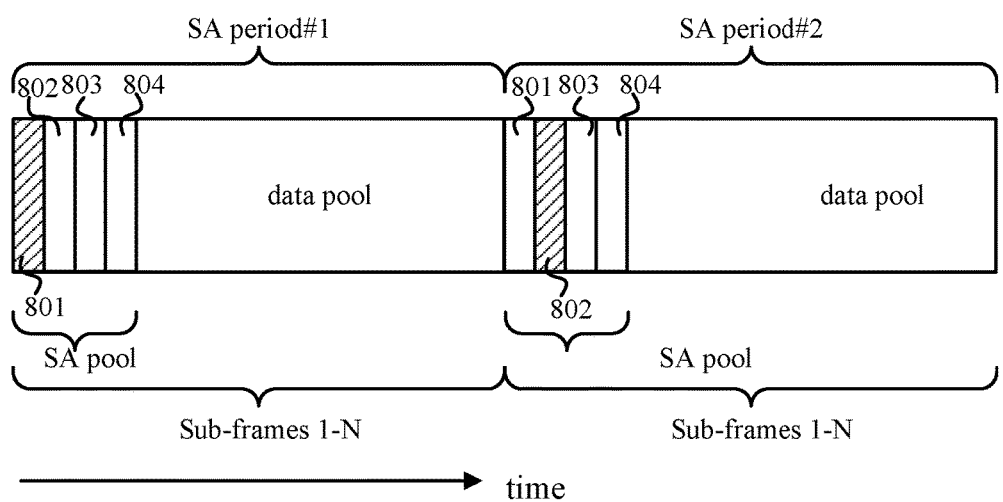
FIG. 8 is another diagram that SA transmission varies in time domain according to an embodiment of the present disclosure.

FIG. 8 is another diagram showing that SA transmission varies in time domain according to an embodiment of the present disclosure.

In the present embodiment, in time domain, the SA pool of one SA period includes multiple SA candidates, the SA candidates to transmit the SA of the D2D-enabled wireless device in one SA period are unchanged in the position of the next SA period but the relative candidate index to transmit the SA is shifted.

Specifically, in the SA period #1, the SA pool including four SA candidates is located at the beginning position of the SA period, and in the SA period #2, the SA pool including four SA candidates is still located at the beginning position of the SA period. In the SA period #1, the SA candidate 701 is used to transmit the SA, but in the SA period #2, the SA candidate 702 is used to transmit the SA. That is, although the whole SA pool is not shifted to another position which is not the same as the original position, the relative index of the SA candidate to transmit the SA is changed, which is shifted from 701 to 702.

Figure 9:
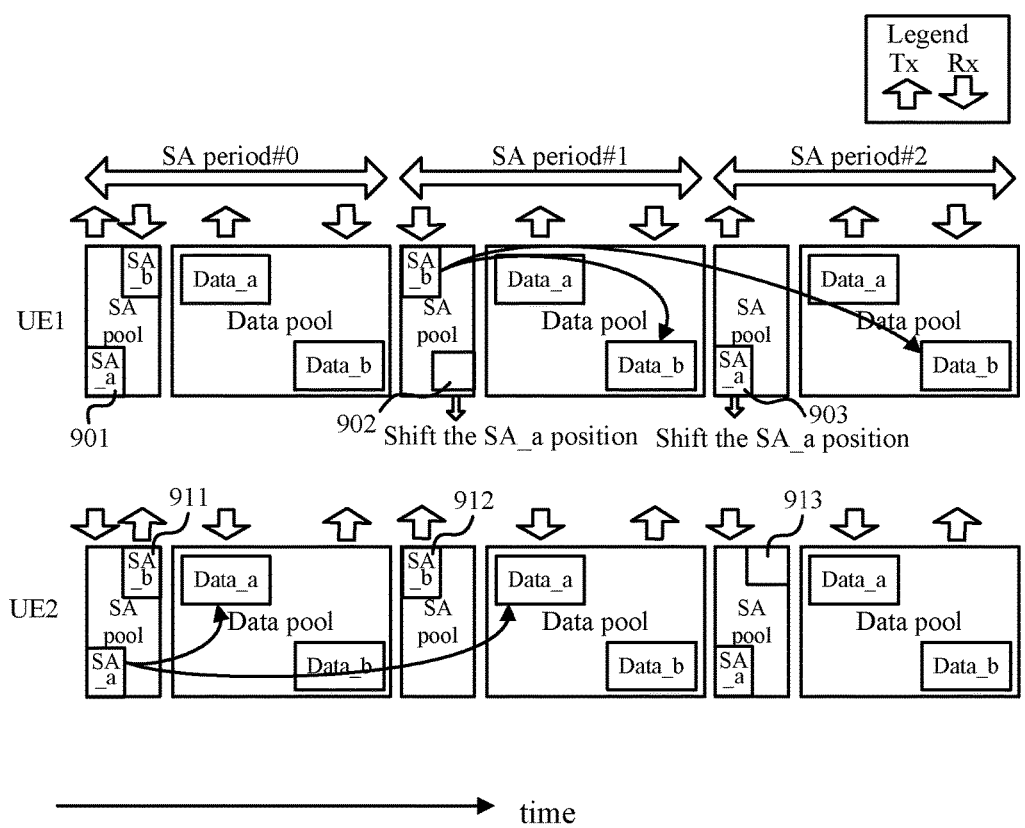
FIG. 9 is a diagram showing how SA candidates to transmit SA are shifted according to an embodiment of the present disclosure.

FIG. 9 is another diagram showing how SA candidates to transmit SA are shifted according to an embodiment of the present disclosure.

As shown in FIG. 9, the SA pool includes multiple SA candidates 901, 902, 903 for the UE1, and SA candidates 911, 912, 913 for the UE2. In the present embodiment, the SA candidate 901 for transmitting "SA_a" in the SA periods #0 for UE1 is cyclically shifted to the SA candidate 902 in the SA periods #1 in time domain, and the SA candidate 902 in the SA periods #1 for UE1 is cyclically shifted to the SA candidate 903 in the SA periods #2 in time domain. The SA candidate 911 in the SA periods #0 for UE2 is cyclically shifted to the SA candidate 912 in the SA periods #1 in time domain, and the SA candidate 912 in the SA periods #1 for UE2 is cyclically shifted to the SA candidate 913 in the SA periods #2 in time domain.

Although the SA candidate 902 for UE1 and the SA candidate 913 for UE2 are reserved without transmitting SAs, they also are cyclically shifted together with other SA candidates of transmitting the SAs in time domain. That is, in the present embodiment, the SA candidates for the same D2D-enabled wireless device are cyclically shifted in time domain, wherein the shifted SA candidates include the reserved SA candidates.

Figure 10:
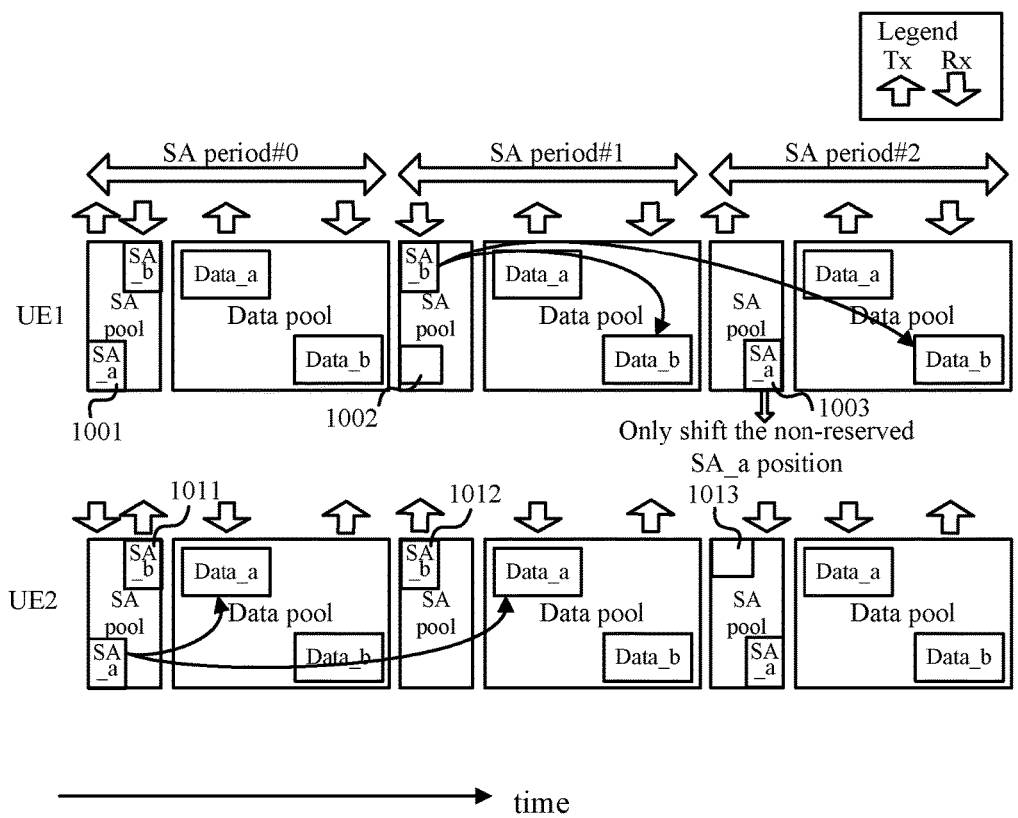
FIG. 10 is another diagram showing how SA candidates to transmit SA are shifted according to an embodiment of the present disclosure.

FIG. 10 is another diagram showing how SA candidates to transmit SA are shifted according to an embodiment of the present disclosure.

As shown in FIG. 10, the SA pool includes multiple SA candidates such as SA candidates 1001, 1002, 1003 for the UE1, and SA candidates 1011, 1012, 1013 for the UE2. In the present embodiment, the SA candidate 1001 in the SA periods #0 for UE1 corresponds to the SA candidate 1002 in the SA periods #1 (without shifting position of the SA candidate 1002) in time domain, but the SA candidate 1002 in the SA periods #1 for UE1 is cyclically shifted to the SA candidate 1003 in the SA periods #2 in time domain. The SA candidate 1011 in the SA periods #0 for UE2 is cyclically shifted to the SA candidate 1012 in the SA periods #1 in time domain, but the SA candidate 1012 in the SA periods #1 for UE2 corresponds to the SA candidate 1013 in the SA periods #2 in time domain (without shifting position of the SA candidate 1013).

In the present embodiment, the SA candidate 1002 for UE1 and the SA candidate 1013 for UE2 are reserved without transmitting SAs, they are not cyclically shifted with other SA candidates of transmitting the SAs in time domain.

That is, in the present embodiment, the SA candidates for the same D2D-enabled wireless device are cyclically shifted in time domain, wherein the shifted SA candidates do not include the reserved SA candidates.

Figure 11:
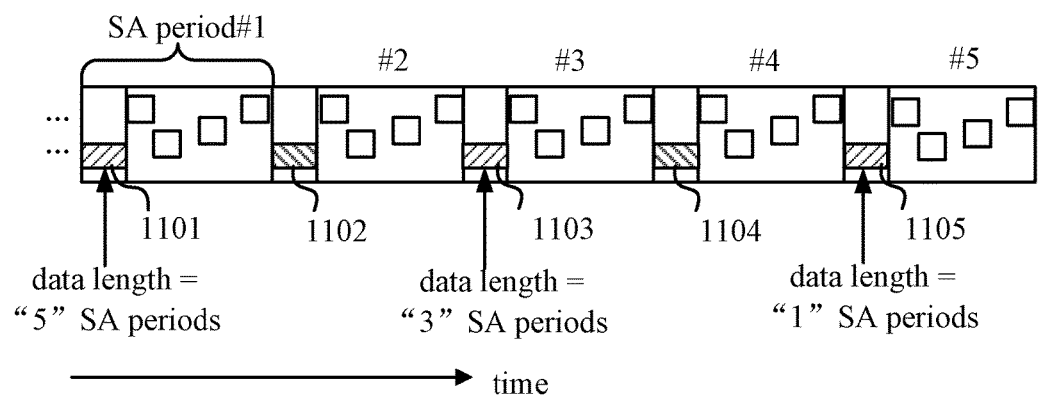
FIG. 11 is a diagram showing that data length indicators of SA in the SA pools for a D2D-enabled wireless device are used for indicating the data length in the SA periods according to an embodiment of the present disclosure.

FIG. 11 is a diagram showing that data length indicators of SA in the SA pools for a D2D-enabled wireless device are used for indicating the data length in the SA periods according to an embodiment of the present disclosure.

In the present embodiment, the data length indicator of the SA of first SA period indicates the whole data length, and the data length indicator of the SA of middle SA periods indicates a reduced data length which reflects remained SA periods for data resource allocation.

Specifically, as shown in FIG. 11, the indicator of SA in the SA pools 1101, 1103, 1105 are used for indicating the data length respectively in remained SA periods. For example, the indicator in SA pool 1101 indicates that the data length will cover five SA periods, the indicator in SA pool 1103 indicates that the data length will cover three SA periods since two SA periods have lapsed, and the indicator in SA pool 1105 indicates that the data length will cover only one SA period since four SA periods have lapsed. That is, the SA indicator in the first SA period indicates the whole data length, and the SA indicators in the middle SA periods indicate a reduced data length considering remained SA periods. The present embodiment needs only few sizes of bits to indicate the data length.

In an example, the metric of the data length may be SA period. In another example, the metric of the data length may be number of sub-frames of device to device communication.

Figure 12:
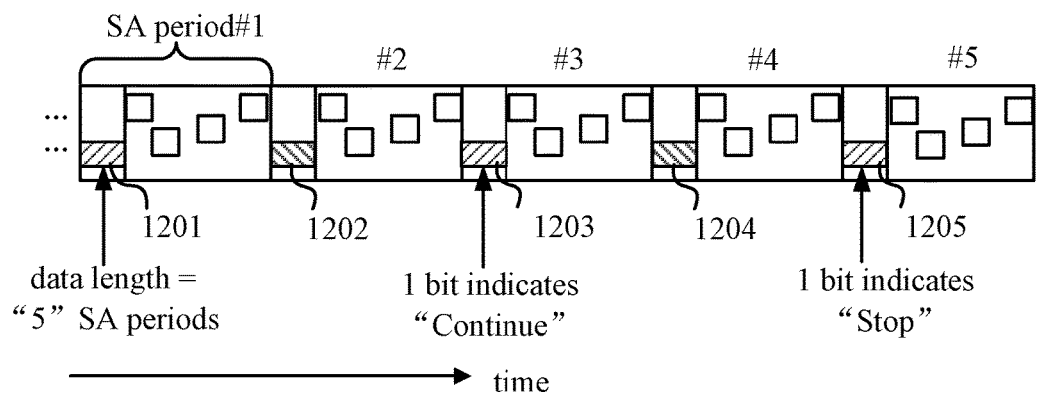
FIG. 12 is a diagram showing that the data length indicators of the SA for a D2D-enabled wireless device are used for indicating the data length in the SA periods according to an embodiment of the present disclosure.

FIG. 12 is a diagram showing that the data length indicators of the SA for a D2D-enabled wireless device are used for indicating the data length in the SA periods according to an embodiment of the present disclosure.

In the present embodiment, the data length indicator of the SA of first SA period indicates the whole data length, and the data length indicator of the SA of middle SA periods indicates "continue" or "stop" using 1 bit for next SA periods.

As shown in FIG. 12, the indicators of SAs 1201, 1203, 1205 are used for indicating the data length respectively in remained SA periods. For example, the indicator of SA 1201 indicates that the data length will cover five SA periods, the indicator of SA 1203 indicates the data will "continue" using only one bit, and the indicator of SA 1205 indicates the data will "stop" using only one bit. That is, the SA indicator in the first SA period indicates the whole data length, and the SA indicators in the middle SA period indicate "continue" or "stop" of the data using 1 bit for next SA periods.

In an example, the one bit "1" could mean "continue", and "0" could mean "stop" and vice versa. 1 bit of data length field of the SA is used for such indication, so other bits can be used for such as virtual CRC. That is, other bits of data length field of the SA except for the 1 bit indicating "continue" or "stop" may be used for virtual CRC.

The present embodiment needs only 1 bit for indicating the data length in next SA periods in the middle SA periods, and uses other bits of data length field of the SA indicator except for the 1 bit for virtual CRC, so the error detection performance could be improved due to the virtual CRC usage.

According to another embodiment of the present application, the embodiments described above can be combined together to form new embodiments. For example, UE1 may use the indicators of SAs 1101, 1103, 1105, or the indicators of SAs 1201, 1203, 1205, to indicate the data length respectively in remained SA periods, in the meantime the reserved SA candidates 1102, 1104, and 1202, 1204 can be used for repetitively transmitting SA of other D2D-enabled wireless device such as UE2 or for transmitting SA for assigning new data resource for other D2D-enabled wireless device such as UE2, as shown in FIGS. 11 and 12.

Figures 13, 14:
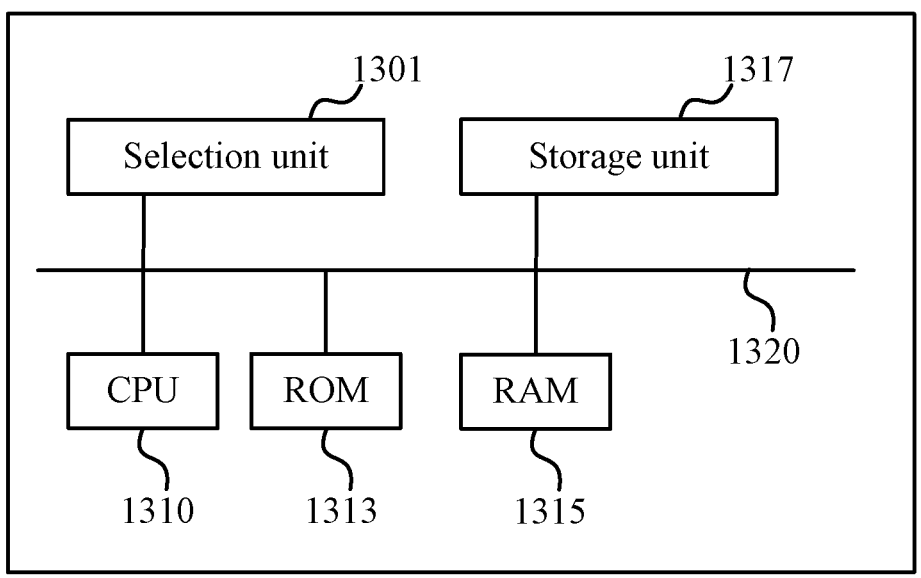
FIG. 13 is a block diagram schematically showing a D2D-enabled wireless device according to an embodiment of the present disclosure.
FIG. 14 is a flow chart of the SA indicating method according to an embodiment of the present disclosure.

FIG. 13 is a block diagram schematically showing a D2D-enabled wireless device according to an embodiment of the present disclosure.

The device-to-device (D2D)-enabled wireless device 1300 according to the present embodiment communicates with other D2D-enabled wireless devices via multiple SA periods, each of the multiple SA periods includes a SA pool and a data pool, wherein the SA pool is used for transmitting SA for assigning data resource of the data pools.

As shown in FIG. 13, the D2D-enabled wireless device 1300 according to the present embodiment comprises a selection unit 1301 which is configured to select the SA resources in SA pools of more SA periods to assign the same data resource for a D2D-enabled wireless device.

In another embodiment, the selection unit 1301 is further configured to use reserved SA resources to repetitively transmit the SAs of other D2D-enabled wireless devices or to transmit SAs of other D2D-enabled wireless devices to assign new data resources, wherein the reserved SA resources are the SA resources linked to the same data resource pattern of the unselected SA periods as the data resource pattern of the selected SA periods.

The embodiments of FIGS. 2-12 as described above can be realized by the D2D-enabled wireless device 1300 according to the present embodiment as described in FIG. 13, and those repetitive descriptions on the same operations will be omitted hereinafter.

The D2D-enabled wireless device 1300 according to the present disclosure may further include a CPU (Central Processing Unit) 1310 for executing related programs to process various data and control operations of respective units in the D2D-enabled wireless device 1300, a ROM (Read Only Memory) 1313 for storing various programs required for performing various process and control by the CPU 1310, a RAM (Random Access Memory) 1315 for storing intermediate data temporarily produced in the procedure of process and control by the CPU 1310, and/or a storage unit 1317 for storing various programs, data and so on. The above selection unit 1301, CPU 1310, ROM 1313, RAM 1315 and/or storage unit 1317 etc. may be interconnected via data and/or command bus 1320 and transfer signals each other.

Respective units as described above do not limit the scope of the present disclosure. According to an embodiment of the present disclosure, the functions of any or combination of the above selection unit 1301 may also be implemented by functional software in combination with the above CPU 1310, ROM 1313, RAM 1315 and/or storage unit 1317 etc.

FIG. 14 is a flow chart of a SA indicating method according to an embodiment of the present disclosure.

The SA indicating method according to the embodiment of the present disclosure is used by device-to-device (D2D)-enabled wireless devices communicating with each other via multiple SA periods, each of the multiple SA periods includes a SA pool and a data pool, wherein the SA pool is used for transmitting SAs for assigning data resources of the data pools.

As shown in FIG. 14, the SA indicating method according to the embodiment of the present disclosure includes a step S1401. At the step 1401, SA pools of more SA periods are selected to transmit SAs for assigning the same data resources for a D2D-enabled wireless device.

In an embodiment, the method further comprising: using reserved SA resources to repetitively transmit the SAs of other D2D-enabled wireless devices, wherein the reserved SA resources are the SA resources linked to the same data resource pattern of the unselected SA periods as the data resource pattern of the selected SA periods.

In an embodiment, the method further comprising: using device ID indicated in SA or linkage between repeated SA index or index of SA resource to be transmitted to determine whether two SAs are repeated.

In an embodiment, the method further comprising: the data resource pattern of other D2D-enabled wireless devices is still determined by original SA index of other D2D-enabled wireless devices.

In an embodiment, the method further comprising: using reserved SA resources to transmit SAs of other D2D-enabled wireless devices to assign new data resources, wherein the reserved SA resources are the SA resources linked to the same data resource pattern of the unselected SA periods as the data resource pattern of the selected SA periods.

In an embodiment, the method further comprising: data resource pattern of other D2D-enabled wireless devices is determined by SA index of the D2D-enabled wireless device and one offset, which is indicated in the SA or specified or pre-defined.

In an embodiment, the method further comprising: transmitting SAs of different D2D-enabled wireless devices in the same or different SA periods in an interleaving way based on the device ID or configuration by eNB or in-coverage UE.

In an embodiment, in time domain, the SA pool of one SA period includes multiple SA candidates, the SA candidates to transmit the SA of the D2D-enabled wireless device in one SA period are shifted to other positions in the SA pool of next SA period but the relative candidate index to transmit such SA is unchanged.

In an embodiment, in time domain, the SA pool of one SA period includes multiple SA candidates, the SA candidates to transmit the SA of the D2D-enabled wireless device in one SA period are unchanged in the position of the SA pool of next SA period but the relative candidate index to transmit the SA is shifted.

In an embodiment, the data length indicator in the SA transmitted in first SA period indicates the whole data length, and the data length indicator in the SA transmitted in middle SA period indicates a reduced data length which reflects remained SA periods for data resource allocation.

In an embodiment, the data length indicator in the SA transmitted in first SA period indicates the whole data length, and the data length indicator in the SA transmitted in middle SA period indicates "continue" or "stop" using 1 bit for next SA periods.

In an embodiment, other bits of data length field of the SA except for the 1 bit indicating "continue" or "stop" are used for virtual CRC.

In an embodiment, when the SA resource of a SA period for assigning the data resource is detected by a D2D-enabled wireless device, the SA resource indicating the same data resource in next SA period is not detected by such a D2D-enabled wireless device.

The above embodiments of the present disclosure are only exemplary description, and their specific structures and operations do not limit the scope of the present disclosure. Those skilled in the art can recombine different parts and operations of the above respective embodiments to produce new implementations which equally accord with the concept of the present disclosure.

The embodiments of the present disclosure may be implemented by hardware, software and firmware or in a combination thereof, and the way of implementation does not limit the scope of the present disclosure.

The connection relationships between the respective functional elements (units) in the embodiments of the present disclosure do not limit the scope of the present disclosure, in which one or multiple functional element(s) or unit(s) may contain or be connected to any other functional elements.

Although several embodiments of the present disclosure has been shown and described in combination with attached drawings above, those skilled in the art would understand that variations and modifications which still fall into the scope of claims and their equivalents of the present disclosure can be made to these embodiments without departing from the principle and spirit of the present disclosure.

What is claimed is:

1. A scheduling assignment (SA) indicating method used by device-to-device (D2D)-enabled wireless devices communicating with each other via multiple SA periods, each SA period including a SA pool and a data pool, wherein the SA pool is used for transmitting SAs for assigning data resources of the data pool, the method comprising:
   selecting SA resources in SA pools of more SA periods to transmit SAs for assigning the same data resources for a D2D-enabled wireless device;
   transmitting the SAs using the selected SA resources; and
   using reserved SA resources to perform one of (i) repetitively transmitting the SAs of other D2D-enabled wireless devices and (ii) transmitting the SAs of other D2D-enabled wireless devices to assign new data resources, wherein the reserved SA resources are the SA resources linked to the same data resource pattern of unselected SA periods as the data resource pattern of the selected SA periods.

2. The method of claim 1, further comprising:
   using a device ID indicated in SA or linkage between repeated SA index or index of SA resource to be transmitted, to determine whether two SAs are repeated.

3. The method of claim 1, further comprising:
   the data resource pattern of other D2D-enabled wireless devices is determined by original SA index of the other D2D-enabled wireless devices.

4. The method of claim 1, further comprising:
   determining the data resource pattern of other D2D-enabled wireless devices by SA index of the D2D-enabled wireless device and one offset that is indicated in the SA or specified or pre-defined.

5. The method of claim 1, further comprising:
   transmitting SAs of different D2D-enabled wireless devices in the same or different SA periods in an interleaving way based on a device ID or configuration by eNB or in-coverage UE.

6. The method of claim 1, wherein in time domain, the SA pool of one SA period includes multiple SA candidates, the SA candidates to transmit the SA of the D2D-enabled wireless device in one SA period are shifted to other positions in a next SA period but a relative candidate index to transmit such SA is unchanged.

7. The method of claim 1, wherein in time domain, the SA pool of one SA period includes multiple SA candidates, the SA candidates to transmit the SA of the D2D-enabled wireless device in one SA period are unchanged in a position of a next SA period but a relative candidate index to transmit the SA is shifted.

8. The method of claim 1, wherein a data length indicator of the SA of first SA period indicates the whole data length, and a data length indicator of the SA of middle SA period indicates a reduced data length which reflects remaining SA periods for data resource allocation.

9. The method of claim 1, wherein a data length indicator of the SA of first SA period indicates the whole data length, and a data length indicator of the SA of middle SA period indicates "continue" or "stop" using 1 bit for next SA periods.

10. The method of claim 9, wherein other bits of a data length field of the SA except for the 1 bit indicating "continue" or "stop" are used for virtual CRC (Cyclic Redundancy Check).

11. The method of claim 1, wherein when the SA resource of a SA period for assigning the data resource is detected by a D2D-enabled wireless device, the SA resource indicating the same data resource in a next SA period is not detected by said D2D-enabled wireless device.

12. A device-to-device (D2D)-enabled wireless device for communicating with other D2D-enabled wireless devices via multiple SA periods, each SA period including a SA pool and a data pool, wherein the SA pool is used for transmitting SAs for assigning data resources of the data pool, the D2D-enabled wireless device comprising:
   a selection unit, which, in operation, selects SA resources in SA pools of more SA periods to transmit SAs for assigning the same data resources for the D2D-enabled wireless device; and
   a transmitter, which, in operation, transmits the SAs using the selected SA resources, and uses reserved SA resources to perform one of (i) repetitively transmitting the SAs of other D2D-enabled wireless devices and (ii) transmitting the SAs of other D2D-enabled wireless devices to assign new data resources, wherein the reserved SA resources are the SA resources linked to the same data resource pattern of unselected SA periods as the data resource pattern of the selected SA periods.

* * * * *